(12) United States Patent
Saravanabhavan et al.

(10) Patent No.: US 11,210,629 B2
(45) Date of Patent: Dec. 28, 2021

(54) SYSTEM AND METHOD FOR OPTIMIZING MANAGEMENT OF INVENTORY DATA

(71) Applicant: Cognizant Technology Solutions India Pvt. Ltd, Chennai (IN)

(72) Inventors: Hari Saravanabhavan, Bangalore (IN); Chandrasekhar Balasubramanyam, Bangalore (IN); Ritu Julka, Noida (IN); Punit Kumar Mishra, Bhubaneswar (IN)

(73) Assignee: COGNIZANT TECHNOLOGY SOLUTIONS INDIA PVT. LTD., Chennai (CN)

( * ) Notice: Subject to any disclaimer, the term of this patent is extended or adjusted under 35 U.S.C. 154(b) by 36 days.

(21) Appl. No.: 16/795,820

(22) Filed: Feb. 20, 2020

(65) Prior Publication Data

US 2021/0192431 A1 Jun. 24, 2021

(30) Foreign Application Priority Data

Dec. 20, 2019 (IN) .............................. 201941053121

(51) Int. Cl.
*G06Q 10/08* (2012.01)
*G06Q 10/06* (2012.01)
*G06Q 10/04* (2012.01)

(52) U.S. Cl.
CPC .......... *G06Q 10/087* (2013.01); *G06Q 10/04* (2013.01); *G06Q 10/0633* (2013.01); *G06Q 10/06312* (2013.01)

(58) Field of Classification Search
CPC ................. G06Q 10/087; G06Q 10/04; G06Q 10/06312; G06Q 10/0633
See application file for complete search history.

(56) References Cited

U.S. PATENT DOCUMENTS

| 8,214,313 | B1 * | 7/2012 | Puskorius | ............ G06Q 10/087 706/28 |
| 8,234,149 | B2 | 7/2012 | Spearman | |
| 8,650,062 | B2 | 2/2014 | Krech | |
| 9,805,402 | B1 * | 10/2017 | Maurer | ................ G06Q 10/087 |

(Continued)

OTHER PUBLICATIONS

Daniel Fritsch, "6 Inventory Control Techniques for Stock Optimization" (https://www.eazystock.com/blog/) 2015.

(Continued)

*Primary Examiner* — Vanel Frenel
(74) *Attorney, Agent, or Firm* — Cantor Colburn LLP (57) ABSTRACT

A system and method for optimizing management of inventory data is provided. A set of variables required for operating an inventory is determined. The set of variables represents one or more parameters associated with stock maintenance data of items present in the inventory. Further, a set of actionable variables from the set of variables is determined based on ranking two or more pre-determined variables from a set of pre-determined variables with respect to one or more target variables. The set of actionable variables represents one or more variables from the ranked variables. Lastly, a correlation is computed between the inventory stock maintenance data and the set of actionable variables based on an optimization model. The optimization model is trained and generated based on the set of actionable variables.

24 Claims, 4 Drawing Sheets

(56) References Cited

U.S. PATENT DOCUMENTS

| | | | |
|---|---|---|---|
| 2001/0047293 A1 | 11/2001 | Waller | |
| 2002/0161674 A1* | 10/2002 | Scheer | G06Q 10/0631 |
| | | | 705/28 |
| 2007/0124009 A1* | 5/2007 | Bradley | G06Q 10/087 |
| | | | 700/99 |
| 2010/0205044 A1* | 8/2010 | Scheer | G06Q 10/08 |
| | | | 705/28 |
| 2011/0082774 A1 | 4/2011 | Spearman | |
| 2013/0080206 A1 | 3/2013 | La Voie | |
| 2014/0195389 A1* | 7/2014 | Henderson | G06Q 10/063 |
| | | | 705/28 |
| 2014/0358828 A1* | 12/2014 | Phillipps | G06N 20/20 |
| | | | 706/12 |

OTHER PUBLICATIONS

Hanna Ekstrand, "Parameters influencing the inventory level and related measures", Department of Technology Management and Economics, Göteborg, Sweden 2012.

Inventory models and their selection parameters: A critical review, Jan. 2013, Internet Article: URL: https://www.researchgate.net/publication/264816363.

Mehdi Firoozi, "A Scenario-Based Inventory Optimization Approach for a Multi-Echelon Network Considering Lateral Transshipment", 6th International Conference on Information Systems, Logistics and Supply Chain ILS Conference Jun. 1-4, 2016, Bordeaux, France.

Qingsong Jiang, "An Optimization Model for Inventory System and the Algorithm for the Optimal Inventory Costs Based on Supply-Demand Balance", vol. 2015, https://doi.org/10.1155/2015/508074, Dec. 10, 2015.

\* cited by examiner

SYSTEM AND METHOD FOR OPTIMIZING MANAGEMENT OF INVENTORY DATA

CROSS REFERENCE TO RELATED APPLICATION

This application is related to and claims the benefit of Indian Patent Application Number 201941053121 filed on Dec. 20, 2019, the contents of which are herein incorporated by reference in their entirety.

FIELD OF THE INVENTION

The present invention relates generally to the field of inventory planning and control. More particularly, the present invention relates to a system and a method for automatically optimizing management of inventory data for efficient inventory planning and control.

BACKGROUND OF THE INVENTION

Inventory planning and control is an essential pre-requisite in a supply chain for keeping the inventory adequately stocked with the desired items in order to cater to demand for items. Inventory planning and control is based usually on data associated with one or more variables, which are further associated with demand of the available stock of items in the inventory and supply of the said stock. For instance, the daily sales of the stock keeping units (SKUs) on the shelf is used for determining the quantity of items which may be reserved in the inventory. The inventory planning and control is further carried out based on other multiple variables data, such as, lead-time required to receive the items in the inventory from various vendors/suppliers/manufacturing units, expected future orders, cost of inventory, availability of SKUs in stores or manufacturing units etc.

The existing inventory data management systems are not able to efficiently determine the influential variables data which is typically essential for appropriate inventory planning and control. Further, the existing systems are not able to distinguish from among large number of influential variables data and determining adequate effect of a particular variable data on the inventory planning and control.

In light of the above drawbacks, there is a need for a system and a method which provides for automatically optimizing management of inventory data. Further, there is a need for a system and a method which provides for efficiently determining influential variables data which is essential for appropriate inventory planning and control.

SUMMARY OF THE INVENTION

In various embodiments of the present invention, a system for optimizing management of inventory data is provided. The system comprises a memory storing program instructions, a processor configured to execute instructions stored in the memory and an inventory data management engine executed by the processor. The inventory data management engine is configured to determine a set of variables required for operating an inventory. The set of variables represents one or more parameters associated with stock maintenance data of items present in the inventory. The inventory data management engine is further configured to determine a set of actionable variables from the set of variables based on ranking two or more pre-determined variables from a set of pre-determined variables with respect to one or more target variables. The set of actionable variables represents one or more variables from the ranked variables. Lastly, the inventory data management engine is configured to compute a correlation between the inventory stock maintenance data and the set of actionable variables based on an optimization model. The optimization model is trained and generated based on the set of actionable variables.

In various embodiments of the present invention, a method for optimizing management of inventory data is provided. The method is implemented by a processor executing instructions stored in a memory. The method comprises determining, by the processor, a set of variables required for operating an inventory. The set of variables represents one or more parameters associated with stock maintenance data of items present in the inventory. Further, method comprises determining, by the processor, a set of actionable variables from the set of variables based on ranking two or more pre-determined variables from a set of pre-determined variables with respect to one or more target variables. The set of actionable variables represents one or more variables from the ranked variables. Lastly, method comprises computing, by the processor, a correlation between the inventory stock maintenance data and the set of actionable variables based on an optimization model. The optimization model is trained and generated based on the set of actionable variables.

In various embodiments of the present invention, a computer program product is provided. The computer program product comprises a non-transitory computer-readable medium having computer-readable program code stored thereon, the computer-readable program code comprising instructions, that when executed by a processor, cause the processor to determine a set of variables required for operating the inventory. The set of variables represents one or more parameters associated with stock maintenance data of items present in the inventory. Further, a set of actionable variables from the set of variables is determined based on ranking two or more pre-determined variables from a set of pre-determined variables with respect to one or more target variables. The set of actionable variables represents one or more variables from the ranked variables. Lastly, a correlation between the inventory stock maintenance data and the set of actionable variables is computed based on an optimization model. The optimization model is trained and generated based on the set of actionable variables.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for automatically optimizing management of inventory data. In particular, the present invention provides for optimizing management of inventory data, which operates the inventory, for efficient inventory planning and control. The present invention, provides for efficiently determining influential variables data which is essential for appropriate inventory planning and control based on optimization techniques. Further, the present invention provides for a system and a method for distinguishing from among multiple influential variables data and for determining the adequate effect of a particular variable data on the inventory planning and control. Further, the present invention provides for a cost effective system and method for management of inventory data.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
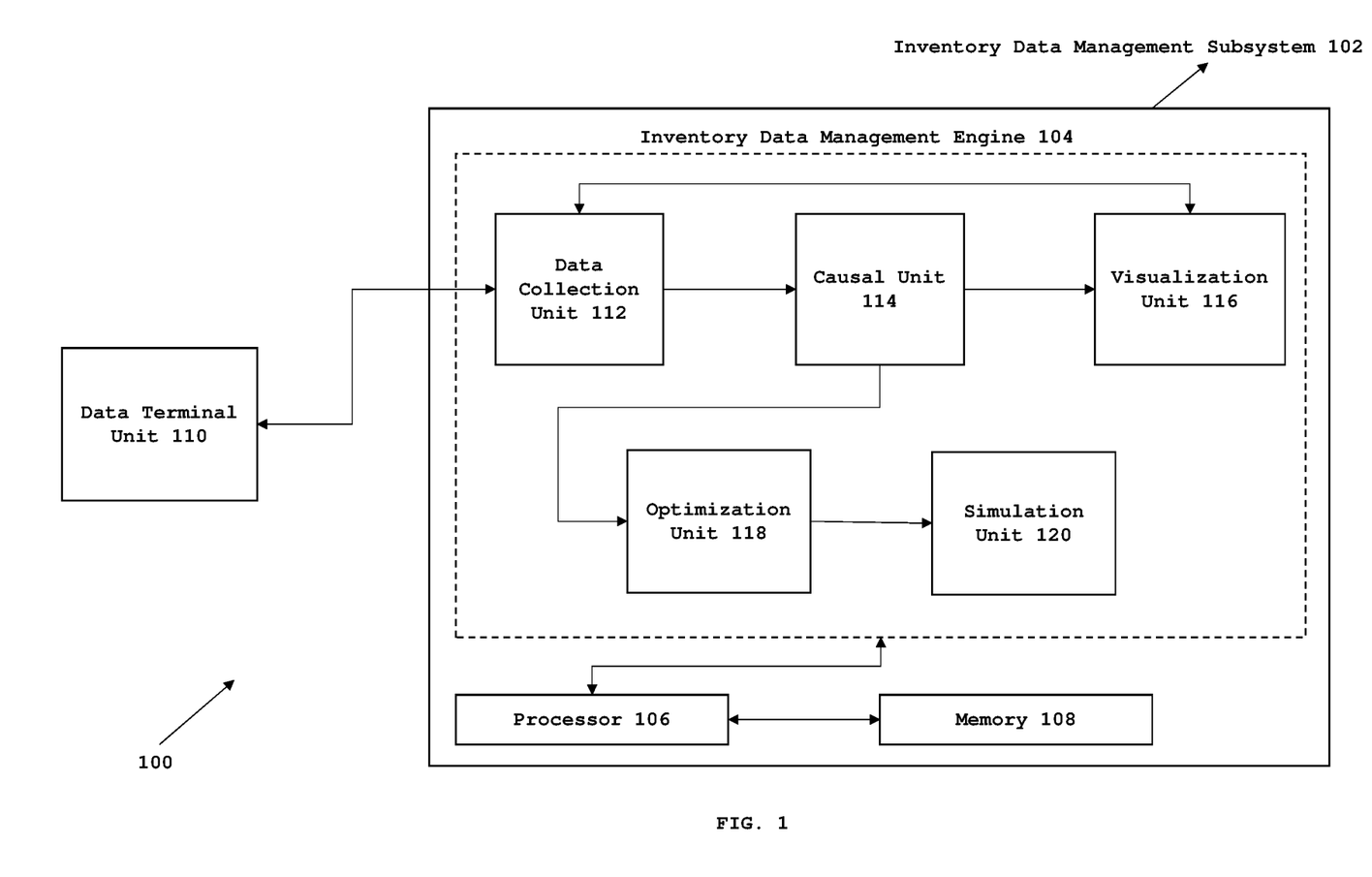
FIG. 1 is a detailed block diagram of a system for optimizing management of inventory data, in accordance with an embodiment of the present invention.

FIG. 1 is a detailed block diagram of a system 100 for optimizing management of inventory data, in accordance with various embodiments of the present invention. Referring to FIG. 1, in an embodiment of the present invention, the system 100 comprises a data terminal unit 110 and an inventory data management subsystem 102.

In an embodiment of the present invention, the subsystem 102 may be implemented in a cloud computing architecture in which data, applications, services, and other resources are stored and delivered through shared data-centers. In an exemplary embodiment of the present invention, the functionalities of the subsystem 102 are delivered to a user as software as a service (SaaS) over a communication network.

In another embodiment of the present invention, the subsystem 102 may be implemented as a client-server architecture. In said embodiment of the present invention, a client terminal accesses a server hosting the subsystem 102 over a communication network. The client terminals may include but are not limited to a smart phone, a computer, a tablet, microcomputer or any other wired or wireless terminal. The server may be a centralized or a decentralized server.

In an embodiment of the present invention, the inventory data management subsystem 102 is a self-optimization and an intelligent system which is configured to analyze data associated with multiple inventories for optimizing inventory planning and control. The inventory may be of different types, such as, but are not limited to, raw material inventory, work-in-process inventory, finished goods inventory, packing material inventory, etc. The inventory data management subsystem 102 is configured to predict probability data associated with delivery of the items to the inventory from a supplier for an order and predict probability data associated with consumption of the stock present in the inventory. Further, the inventory data management subsystem 102 is configured to compute the demand and supply data of each item present in the inventory and compute data associated with variables based on which the demand and supply data of each item present in the inventory is affected. Furthermore, the inventory data management subsystem 102 is configured to determine the most essential variables data from multiple variables data for optimizing the management of the inventory data. In an embodiment of the present invention, the inventory data management subsystem 102 comprises an inventory data management engine 104, a processor 106 and a memory 108.

In various embodiments of the present invention, the inventory data management engine 104 comprises multiple units which work in conjunction with each other for optimizing management of inventory data. The various units of the inventory data engine 104 are operated via the processor 106 specifically programmed to execute instructions stored in the memory 108 for executing respective functionality of the units of the engine 104 in accordance with various embodiments of the present invention.

In an embodiment of the present invention, the inventory data management engine 104 comprises a data collection unit 112, a causal unit 114, a visualization unit 116, an optimization unit 118 and a simulation unit 120.

In an embodiment of the present invention, the data collection unit 112 of the inventory data management engine 104 is configured to receive data associated with one or more inventories via the data terminal unit 110. The inventories may be associated with various entities or organizations. The entities or organizations may include, but are not limited to, automobile, retail, pharmaceutical, food and beverages, e-commerce, publication, technology, manufacturing, etc. The entities or organizations may maintain a single inventory or multiple inventories. The entities or organizations stores, maintains and updates their inventory data in a database (not shown), which may be positioned at a local location or a remote location. The data terminal unit 110 operates in conjunction with various databases (not shown) associated with various inventories. The data terminal unit 110 is configured to fetch the inventory data from the databases (not shown) and transmit the fetched data to the data collection unit 112 via a communication channel (not shown). The communication channel (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

In an embodiment of the present invention, the data collection unit 112 is configured to process the received inventory data for determining the data specific to an inventory associated with the entity or industry. The inventory specific data may include, but is not limited to, manufacturing data, orders data, install base data, entity data, current stock data, expected orders data, order delivery date and time, etc.

In an embodiment of the present invention, the causal unit 114 is configured to receive the inventory specific data from the data collection unit 112. The causal unit 114 is configured to collate or integrate the inventory specific data associated with a particular inventory. The causal unit 114 collates the inventory specific data in a pre-defined format. The pre-defined format may include, but is not limited to, a structured table format comprising inventory specific data in a sequential order, an unstructured text format etc.

In an embodiment of the present invention, the causal unit 114, subsequent to collating the inventory specific data, is configured to determine a set of variables which are required for operating the inventory. The set of variables represents one or more parameters associated with stock maintenance data of items present in the inventory. The set of variables is further associated with the collated inventory specific data. The one or more parameters associated with stock maintenance data of items comprises one or more factors associated with the demand and supply data of the items present in the inventory. Further, the one or more factors associated with the demand and supply data of the items are dependent on the type of the entity or industry. Therefore, the demand and supply data of each item is associated with separate factors. For example, an inventory associated with an automobile entity or industry may be stocked with items such as, gearboxes, shafts, bearings, exhaust pipes, automobile engine, spark plugs, tires, batteries, machine lubricants, etc., which are used in assembling a particular vehicle such as a car, motor bike, truck etc. The data associated with the supply factors of the items may include, but are not limited to, lead-time period of delivery data, data of time period of supply of an item, data of mode of transportation utilized, data of transportation issues, data of packaging used for the item, data of date and timing of delivery, data of price of the item etc. The data associated with the demand factors of the items may include, but are not limited to, data of source of demand (e.g. demand is from a consumer, a retailer, a showroom, a company, etc.), data of the month of demand (e.g. a festive month, non-festive month, seasonal month, etc.), data of bulk demand etc.

In an exemplary embodiment of the present invention, the causal unit 114 is configured to apply one or more feature selection techniques on the collated inventory data for determining the set of variables which are required for operating the inventory. The feature selection techniques utilized may include, but are not limited to, information theory, random forest algorithm, logistic regression algorithm, etc.

In another embodiment of the present invention, the causal unit 114 is further configured to determine a set of actionable variables from the set of variables required for operating the inventory. The set of actionable variables are determined by the causal unit 114 based on ranking one or more pre-determined variables from a set of pre-determined variables which are fetched from the inventory's database (not shown). In an exemplary embodiment of the present invention, in order to determine the set of actionable variables from the set of variables, the set of pre-determined variables are marked by the causal unit 114 as '$x_1$', '$x_2$', '$x_3$', '$x_4$', '$x_5$' . . . '$x_n$' and further the causal unit 114 selects a target variable or a combination of the target variables, which is to be optimized, from the set of pre-determined variables and marks the target variables as '$y_1$', '$y_2$', '$y_3$' . . . '$y_n$' respectively. The target variables may include, but are not limited to, optimizing the storage capacity of the inventory, selecting a best date and timing for item deliver to the inventory, day of delivery and location of delivery, revenue and cost incurred while delivering the items to the inventory etc. or a combination of the said target variables, etc. The causal unit 114 thereafter is configured to determine a correlation between the variables '$x_1$', '$x_2$', '$x_3$', '$x_4$', '$x_5$' . . . '$x_n$' and the target variables '$y_1$', '$y_2$', '$y_3$' . . . '$y_n$' respectively or the effect of each variable '$x_1$', '$x_2$', '$x_3$', '$x_4$', '$x_5$' . . . '$x_n$' on the target variables '$y_1$', '$y_2$', '$y_3$' . . . '$y_n$' respectively utilizing the feature selection technique. For example, if variable '$x_1$' relates to lead-time of the supplier of an item and the target variable '$y_1$' relates to selecting best date and timing for delivery of the item, then the relation between the '$x_1$' on the target variable '$y_1$' is determined based on the effect of '$x_1$' on the target variable '$y_1$' i.e. if the lead-time of supplier for an item is less, then a best day and timing of delivery may be computed or if the lead-time of supplier for an item is more, then the best day and timing of delivery may not be computed adequately. Similarly, the effect of all the other variables such as, '$x_2$', '$x_3$', '$x_4$', '$x_5$' . . . '$x_n$' on each target variables '$y_2$', '$y_3$' . . . '$y_n$' is determined. Further, the set of actionable variables are unique and separate for the demand factors and supply factors.

The causal unit 114, based on the effect of each variables '$x_1$', '$x_2$', '$x_3$', '$x_4$', '$x_5$' . . . '$x_n$' separately on the target variables '$y_1$', '$y_2$', '$y_3$' . . . '$y_n$', is configured to rank each variable '$x_1$', '$x_2$', '$x_3$', '$x_4$', '$x_5$' . . . '$x_n$' in an order. The variable having best effect on the target variables $y_1$', '$y_2$', '$y_3$' . . . '$y_n$' is ranked as number one, whereas the variable having a worst effect on the target variables $y_1$', '$y_2$', '$y_3$' . . . '$y_n$' is ranked the least. The causal unit 114 utilizes one or more statistical techniques for ranking the two or more pre-determined variables. The statistical techniques may include, but are not limited to, principal component analysis technique, correlation coefficients, regression coefficients, mutual information, p-values of hypothesis tests, etc. The causal unit 114 is therefore configured to determine the set of actionable variables from the ranked two or more pre-determined variables. The set of actionable variables represents one or more variables from the ranked variables which are to be computed for optimizing the management of inventory data. Advantageously, the causal unit 114 computes optimization of inventory data based on only the actionable variables and does not compute optimization of inventory data based on all the variables present in the set of variables.

In an embodiment of the present invention, the visualization unit 116 is configured to receive the set of variables and the set of actionable variables from the causal unit 114. The visualization unit 116 may include, an application programming interface (API), a graphical user interface (GUI), a user interface (UI), etc. The visualization unit 116 is configured on the user device such as, computer system, smart phone, tablet, etc. The visualization unit 116 is configured to provide and display data associated with the daily consumption of the inventory, item stock data, supply data of items from the inventory, orders data, etc. based on the set of variables and the set of actionable variables received from the causal unit 114. The visualization unit 116 is updated by the causal unit 114 at pre-defined time intervals for rendering the latest inventory data. In another embodiment of the present invention, the visualization unit 116 is configured to communicate with the data collection unit 112 to provide and display existing inventory data and previous inventory data.

In another embodiment of the present invention, the visualization unit 116 is further configured to generate an alert notification and send to the user's device associated with the inventory based on a pre-defined threshold limit associated with the set of actionable variables. The pre-determined threshold limit represents the items stock limit in the inventory. The pre-defined threshold limit may be set in accordance with the set of actionable variables for a particular entity or industry. For example, in an automobile inventory, the pre-defined threshold limit for gearboxes stock is 50 in order to meet the demand, which is a variable in the set of actionable variables, and if the number of gearboxes decreases below 50, then an alert notification is generated and provided to the user via the user's device. In yet another embodiment of the present invention, the visualization unit 116, based on the alert notification, is configured to generate a triggering action for maintaining the pre-defined threshold limit. The triggering action may include, but is not limited to, placing auto order, if stock level of an item is below the pre-determined threshold limit; issuing no consumption orders, if the stock level of the item is to maintained at the pre-determined threshold limit; etc.

In an embodiment of the present invention, the optimization unit 118 is configured to receive the output from the causal unit 114 comprising the set of actionable variables. The optimization unit 118 is configured to compute a correlation between inventory stock maintenance data and the set of actionable variables. In an embodiment of the present invention, the optimization unit 118 is configured to firstly train and generate an optimization model in order to compute the correlation between the inventory stock maintenance data and the set of actionable variables. The set of actionable variables may be associated with the stock maintenance data of the inventory and may therefore include, but are not limited to, day of order, day of delivery of the item, time or order, time of delivery of the item, demand of the item, supply time period for the item, minimum number of stock of items in the inventory etc. The optimization model is trained and generated based on the set of actionable variables. The optimization unit 118 is configured to utilize at least one of heuristic, search and optimization techniques for training and generating the optimization model. The heuristic, search and optimization techniques utilized may include, but are not limited to, genetic algorithms, harmony search, ant colony optimization, particle swarm optimization, simulated annealing, etc.

In another embodiment of the present invention, the optimization unit 118 is configured to optimize the set of actionable variables utilizing the generated optimization model. For example, if the actionable variable relates to maintaining a pre-defined number of cars stock in a car inventory, then the optimization model is configured to compute a minimum number of cars which needs to be stocked in the inventory for best utilization of the resources of the inventory and cater the demand. For instance, the optimization model may compute a minimum number of cars as 50, which needs to be stocked in the inventory for best utilization of the resources of the inventory and cater the demand.

In an embodiment of the present invention, the simulation unit 120 is configured to receive the optimized set of actionable variables from the optimization unit 118. The simulation unit 120 is configured to compute a modification of the optimized set of actionable variables received from the optimization unit 118, if the optimized set of actionable variables are not implementable for the inventory data management. The simulator unit 120 is configured with one or more pre-defined optimization events associated with set of actionable variables based on which the set of actionable variables are modified. The simulator unit 120 therefore computes the modification of the optimized set of actionable variables based on the pre-defined optimization events. For example, an inventory associated with a chemical industry stocks a particular chemical and in order to meet the demand at least 100 units of that chemical may be stocked in the inventory. The optimization unit 118 optimizes the actionable variable from the set of actionable, such as, delivery time of the chemical as 12 pm as best delivery time of the chemical, but no labor is available at that optimized time in order to stock the chemical in the inventory, then the simulator unit 120 may modify the optimized time from 12 pm to 8 pm, as at that time labor may be available for stocking the chemical in the inventory. The simulator unit 120 configured with the one or more pre-defined optimization events, utilized for modifying the optimized set of actionable variables may include, but are not limited to, resource constraints, regulatory constraints, demand constraints, feasibility issues, safety issues, compliance issues, viability scenarios and order approval requirements.

Advantageously, in accordance with various embodiments of the present invention, the subsystem 102 is configured to efficiently optimize the management of inventory data for effective inventory planning and controlling. The subsystem 102 is configured to operate with any type of inventory for efficiently optimizing the management of inventory data. The subsystem 102 is configured to automatically determine multiple variables associated with the inventory data management, which are required for inventory planning and control. The subsystem 102 is configured to compute only essential variables from the required variables for inventory data management and inventory planning and control, thereby providing fast inventory data optimization. Further, the subsystem 102 is configured to automatically generate alerts for controlling the ordering of items to the inventory and stop the consumption of items. Furthermore, the subsystem 102 provides a cost effective inventory data optimization for improved inventory planning and control.

Figure 2:
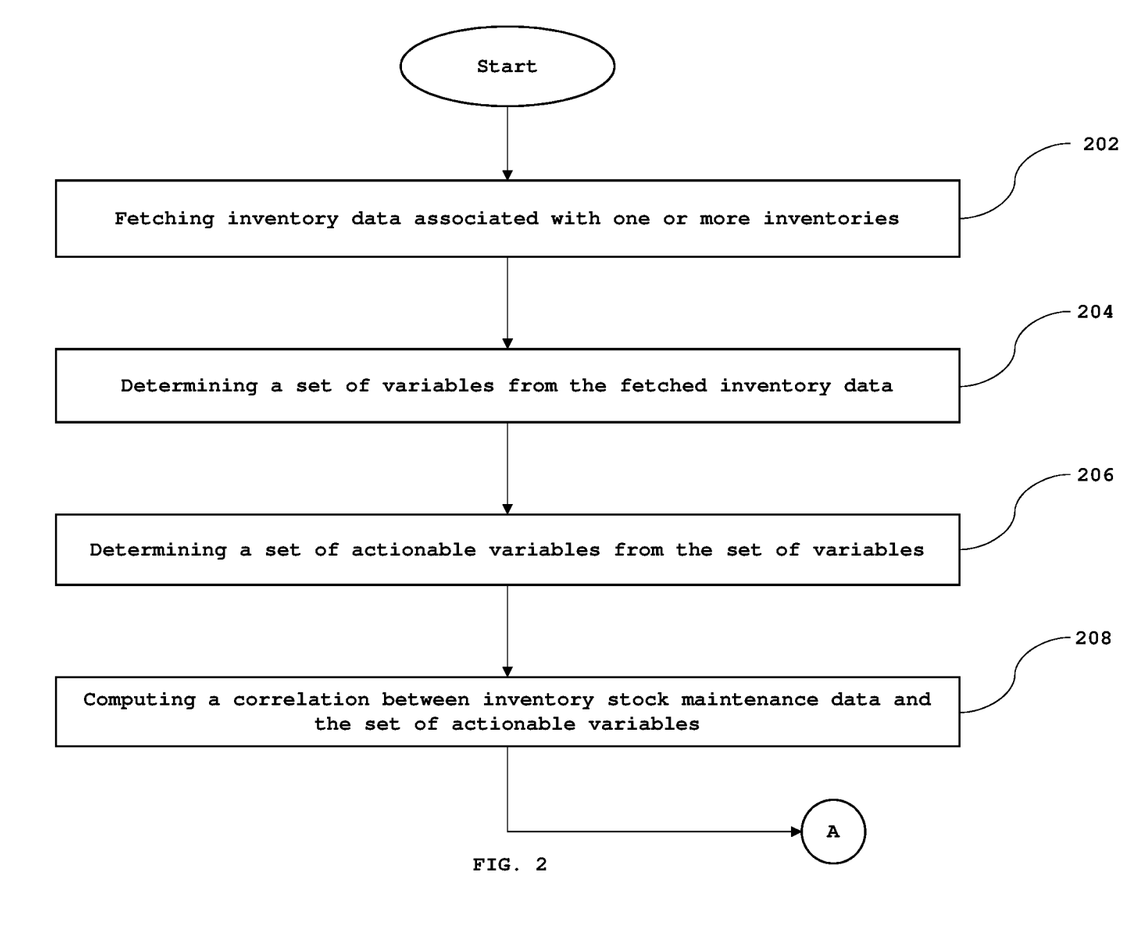
FIG. 2 and FIG. 2A is a flowchart illustrating a method for optimizing management of inventory data, in accordance with an embodiment of the present invention.
Figure 2A:
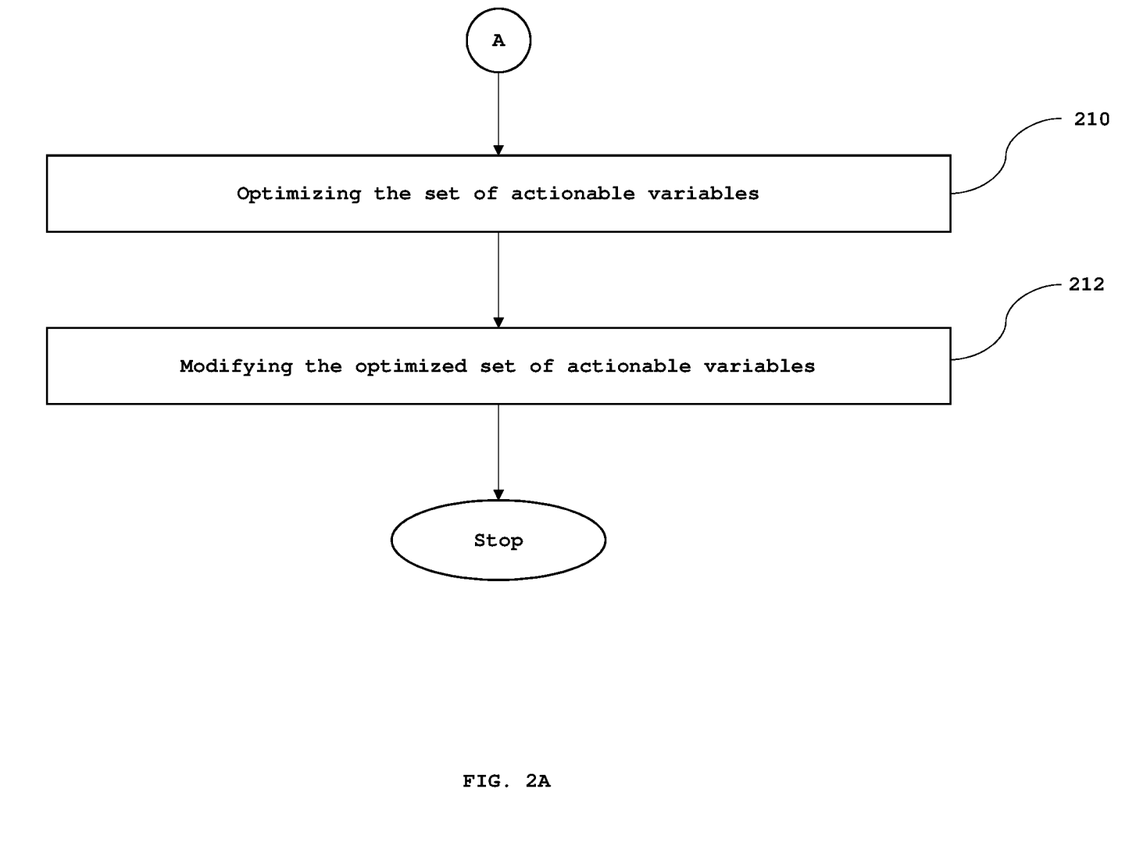

FIG. 2 and FIG. 2A is a flowchart illustrating a method for optimizing management of inventory data, in accordance with various embodiments of the present invention.

At step 202, inventory data associated with one or more inventories is fetched. In an embodiment of the present invention, data associated with one or more inventories is received. The inventories may be associated with various entities or organizations. The entities or organizations may include, but are not limited to, automobile, retail, pharmaceutical, food and beverages, e-commerce, publication, technology, manufacturing, etc. The entities or organizations may maintain a single inventory or multiple inventories. The entities or organizations stores, maintains and updates their inventory data in a database, which may be positioned at a local location or a remote location. The inventory data from the databases is fetched and transmitted via a communication channel. The communication channel may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

In an embodiment of the present invention, the received inventory data is processed for determining the data specific to an inventory associated with the entity or industry. The inventory specific data may include, but is not limited to, manufacturing data, orders data, install base data, entity data, current stock data, expected orders data, order delivery date and time etc.

At step 204, a set of variables from the fetched inventory data is determined. In an embodiment of the present invention, the inventory specific data associated with a particular inventory is collated or integrated. The inventory specific data is collated in a pre-defined format. The pre-defined format may include, but is not limited to, a structured table format comprising inventory specific data in a sequential order, an unstructured text format etc.

In an embodiment of the present invention, subsequent to collating the inventory specific data, a set of variables which are required for operating the inventory is determined. The set of variables represents one or more parameters associated with stock maintenance data of items present in the inventory. The set of variables are further associated with the collated inventory specific data. The one or more parameters associated with stock maintenance data of items comprises one or more factors associated with demand and supply data of the items present in the inventory. Further, the one or more factors associated with the demand and supply data of the items are dependent on the type of the entity or industry. Therefore, the demand and supply data of each item is associated with separate factors. For example, an inventory associated with an automobile entity or industry may be stocked with items such as, gearboxes, shafts, bearings, exhaust pipes, automobile engine, spark plugs, tires, batteries, machine lubricants, etc., which are used in assembling a particular vehicle such as a car, motor bike, truck etc. The data associated with the supply factors of the items may include, but are not limited to, lead-time period of delivery data, data of time period of supply of an item, data of mode of transportation utilized, data of transportation issues, data of packaging used for the item, data of date and timing of delivery, data of price of the item etc. The data associated with the demand factors of the items may include, but are not limited to, data of source of demand (e.g. demand is from a consumer, a retailer, a showroom, a company, etc.), data of the month of demand (e.g. a festive month, non-festive month, seasonal month, etc.), data of bulk demand etc.

In an exemplary embodiment of the present invention, one or more feature selection techniques are applied on the collated inventory data for determining the set of variables which are required for operating the inventory. The feature selection techniques utilized may include, but are not limited to, information theory, random forest algorithm, logistic regression algorithm, etc.

At step 206, a set of actionable variables from the set of variables is determined. In an embodiment of the present invention, the set of actionable variables are determined based on ranking one or more pre-determined variables from a set of pre-determined variables which are fetched from the inventory's database. In an exemplary embodiment of the present invention, in order to determine the set of actionable variables from the set of variables, the set of pre-determined variables are marked as '$x_1$', '$x_2$', '$x_3$', '$x_4$', '$x_5$' ... '$x_n$' and further a target variable or a combination of the target variables is selected, which is to be optimized, from the set of pre-determined variables and the target variables are marked as '$y_1$', '$y_2$', '$y_3$' ... '$y_n$' respectively. The target variables may include, but are not limited to, optimizing the storage capacity of the inventory, selecting a best date and timing for item deliver to the inventory, day of delivery and location of delivery, revenue and cost incurred while delivering the items to the inventory etc. or a combination of the said target variables etc. A correlation between the variables '$x_1$', '$x_2$', '$x_3$', '$x_4$', '$x_5$' ... '$x_n$' and the target variables '$y_1$', '$y_2$', '$y_3$' ... '$y_n$' respectively is determined based on the effect of each variable '$x_1$', '$x_2$', '$x_3$', '$x_4$', '$x_5$' ... '$x_n$' on the target variables $y_1$', '$y_2$', '$y_3$' ... '$y_n$' respectively utilizing the feature selection technique. For example, if variable '$x_1$' relates to lead-time of the supplier of an item and the target variable '$y_1$' relates to selecting best date and timing for delivery of the item, then the relation between the '$x_1$' on the target variable '$y_1$' is determined based on the effect of '$x_1$' on the target variable '$y_1$' i.e. if the lead-time of supplier for an item is less, then a best day and timing of delivery may be computed or if the lead-time of supplier for an item is more, then the best day and timing of delivery may not be computed adequately. Similarly, the effect of all the other variables such as, '$x_2$', '$x_3$', '$x_4$', '$x_5$' ... '$x_n$' on each target variable '$y_2$', '$y_3$' ... '$y_n$' is determined. Further, the set of actionable variables are unique and separate for the demand factors and supply factors.

Further, based on the effect of each variables '$x_1$', '$x_2$', '$x_3$', '$x_4$', '$x_5$' ... $x_n$ separately on the target variables '$y_1$', '$y_2$', '$y_3$' ... '$y_n$', each variable '$x_1$', '$x_2$', '$x_3$', '$x_4$', '$x_5$' ... '$x_n$' is ranked in an order. The variable having best effect on the target variables $y_1$', '$y_2$', '$y_3$' ... '$y_n$' is ranked as number one, whereas the variable having a worst effect on the target variables $y_1$', '$y_2$', '$y_3$' ... '$y_n$' is ranked the least. One or more statistical techniques are utilized for ranking the two or more pre-determined variables. The statistical technique may include, but is not limited to, principal component analysis technique, correlation coefficients, regression coefficients, mutual information, p-values of hypothesis tests, etc. Therefore, the set of actionable variables from the ranked two or more pre-determined variables is determined. The set of actionable variables represents one or more variables from the ranked variables which are to be computed for optimizing the management of inventory data.

In an embodiment of the present invention, the data associated with daily consumption of the inventory, items stock data, supply data of items from the inventory, items orders data, etc. is provided for visualization based on the set of variables and the set of actionable variables. The visualization data is updated at pre-defined time intervals for rendering the latest inventory data. In another embodiment of the present invention, existing inventory data and previous inventory data is provided and displayed.

In another embodiment of the present invention, an alert notification is generated and sent to the user's device associated with the inventory based on a pre-defined threshold limit associated with the set of actionable variables. The pre-determined threshold limit represents the items stock limit in the inventory. The pre-defined threshold limit may be set in accordance with the set of actionable variables for a particular entity or industry. For example, in an automobile inventory, the pre-defined threshold limit for gearboxes stock is 50 in order to meet the demand, which is a variable in the set of actionable variables, and if the number of gearboxes decreases below 50, then an alert notification is generated and provided to the user via the user's device. In yet another embodiment of the present invention, based on the alert notification, a triggering action is generated for maintaining the pre-defined threshold limit. The triggering action may include, but is not limited to, placing auto order, if stock level of an item is below the pre-determined threshold limit; issuing no consumption orders, if the stock level of the item is to maintained at the pre-determined threshold limit; etc.

At step 208, a correlation between inventory stock maintenance data and the set of actionable variables is computed. In an embodiment of the present invention, firstly an optimization model is trained and generated in order to compute the correlation between the inventory stock maintenance data and the set of actionable variables. The set of actionable variables may be associated with stock maintenance data of the inventory and may therefore include, but are not limited to, day of order, day of delivery of the item, time or order, time of delivery of the item, demand of the item, supply time period for the item, minimum number of stock of items in the inventory etc. The optimization model is trained and generated based on the set of actionable variables. Further, at least one of heuristic, search and optimization techniques are utilized for training and generating the optimization model. The heuristic, search and optimization techniques utilized may include, but are not limited to, genetic algorithms, harmony search, ant colony optimization, particle swarm optimization, simulated annealing, etc.

At step 210, the set of actionable variables are optimized. In an embodiment of the present invention, the set of actionable variables are optimized utilizing the generated optimization model. For example, if the actionable variable relates to maintaining a pre-defined number of cars stock in a car inventory, then the optimization model is configured to compute a minimum number of cars which needs to be stocked in the inventory for best utilization of the resources of the inventory and cater the demand. For instance, the optimization model may compute a minimum number of cars as 50, which needs to be stocked in the inventory for best utilization of the resources of the inventory and cater the demand.

At step 212, the optimized set of actionable variables are modified. In an embodiment of the present invention, the modification of the optimized set of actionable variables is computed, if the optimized set of actionable variables are not implementable for the inventory data management. One or more pre-defined optimization events associated with set of actionable variables are utilized for modifying the set of actionable variables. For example, an inventory associated with a chemical industry stocks a particular chemical and in order to meet the demand at least 100 units of that chemical may be stocked in the inventory. The actionable variable from the set of actionable is optimized, such as, delivery time of the chemical as 12 pm as best delivery time of the chemical, but no labor is available at that optimized time in order to stock the chemical in the inventory, then the optimized time is modified from 12 pm to 8 pm, as at that time labor may be available for stocking the chemical in the inventory. Further, the one or more pre-defined optimization events utilized for modifying the optimized set of actionable variables may include, but are not limited to, resource constraints, regulatory constraints, demand constraints, feasibility issues, safety issues, compliance issues, viability scenarios and order approval requirements.

Figure 3:
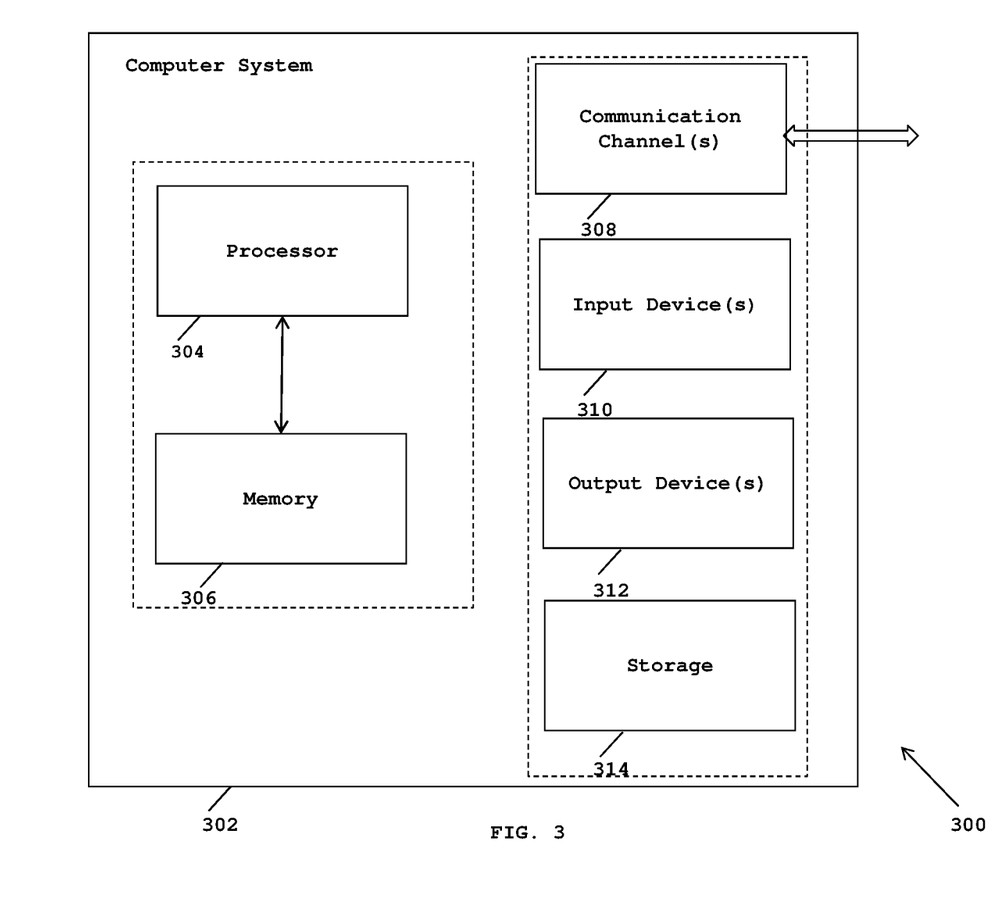
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for optimizing management of inventory data, the system comprising:
   a memory storing program instructions;
   a processor configured to execute instructions stored in the memory; and
   an inventory data management engine executed by the processor and configured to:
      determine a set of variables required for operating an inventory, wherein the set of variables represents one or more parameters associated with stock maintenance data of items present in the inventory,
         wherein the one or more parameters comprises one or more factors associated with demand and supply data of the items and industry type; and
         wherein the demand and supply data of each item is associated with a unique and separate set of first factors and a set of second factors respectively, and
            wherein the first set of factors associated with the demand data comprises of data of source of demand, month of demand, and bulk demand; and
            wherein the second set of factors associated with the supply data comprises of lead-time period of delivery date, date of time period of supply, mode of transportation, data of transportation issues, data of packaging, data of date and timing of delivery, data of price of the item;
      determine a set of actionable variables from the set of variables based on ranking two or more pre-determined variables from a set of pre-determined variables with respect to one or more target variables, wherein the set of actionable variables represents one or more variables from the ranked variables; and
      compute a correlation between the inventory stock maintenance data and the set of actionable variables based on an optimization model, wherein the optimization model is trained and generated based on the set of actionable variables.

2. The system as claimed in claim 1, wherein the system comprises a data collection unit executed by the processor and configured to receive data associated with the inventory from a data terminal unit and determine data specific to the inventory, and wherein the inventory data comprises at least manufacturing data, orders data, install base data, entity data, current stock data, expected orders data and order delivery date and time.

3. The system as claimed in claim 1, wherein the system comprises a causal unit executed by the processor and configured to collate data associated with the inventory in a pre-defined format, and wherein the pre-defined format includes a structured table format comprising inventory specific data in a sequential order and an unstructured text format.

4. The system as claimed in claim 3, wherein the set of variables are determined by applying one or more feature selection techniques on the collated inventory data, and wherein the feature selection techniques comprises at least information theory, random forest algorithm and logistic regression algorithm.

5. The system as claimed in claim 1, wherein the one or more target variables comprises at least optimizing the storage capacity of the inventory, selecting a best date and timing for item deliver to the inventory, day of delivery and location of delivery and revenue and cost incurred while delivering the items to the inventory.

6. The system as claimed in claim 1, wherein the ranking is carried out based on one or more statistical techniques, and wherein the statistical techniques comprises at least one of: principal component analysis technique, correlation coefficients, regression coefficients, mutual information and p-values of hypothesis tests.

7. The system as claimed in claim 1, wherein the system comprises a visualization unit executed by the processor and configured to display at least existing inventory data, previous inventory data, data associated with daily consumption of the inventory, items stock data, supply data of items from the inventory and items orders data based on the set of variables and the set of actionable variables.

8. The system as claimed in claim 7, wherein the visualization unit is configured to generate an alert notification based on a pre-defined threshold limit associated with the set of actionable variables.

9. The system as claimed in claim 8, wherein the visualization unit, based on the alert notification, is configured to generate a triggering action for maintaining the pre-defined threshold limit.

10. The system as claimed in claim 1, wherein the system comprises an optimization unit executed by the processor and configured to train and generate the optimization model based on at least one of heuristic techniques, search techniques and optimization techniques, and wherein the heuristic techniques, search techniques and optimization techniques comprises genetic algorithms, harmony search, ant colony optimization, particle swarm optimization and simulated annealing.

11. The system as claimed in claim 10, wherein the optimization unit is configured to optimize the set of actionable variables based on the generated optimization model.

12. The system as claimed in claim 1, wherein the system comprises a simulation unit executed by the processor and configured to modify optimized set of actionable variables based on one or more pre-defined optimization events associated with the set of actionable variables.

13. The system as claimed in claim 12, wherein the one or more pre-defined optimization events comprises at least resource constraints, regulatory constraints, demand constraints, feasibility issues, safety issues, compliance issues, viability scenarios and order approval requirements.

14. A method for optimizing management of inventory data, wherein
   the method is implemented by a processor executing instructions stored in a memory, the method comprising:
      determining, by the processor, a set of variables required for operating an inventory, wherein the set of variables represents one or more parameters associated with stock maintenance data of items present in the inventory;
         wherein the one or more parameters comprises one or more factors associated with demand and supply data of the items and industry type; and
         wherein the demand and supply data of each item is associated with a unique and separate set of first factors and a set of second factors respectively, and
            wherein the first set of factors associated with the demand data comprises of data of source of demand, month of demand, and bulk demand; and
            wherein the second set of factors associated with the supply data comprises of lead-time period of delivery date, date of time period of supply, mode of transportation, data of transportation issues, data of packaging, data of date and timing of delivery, data of price of the item;

determining, by the processor, a set of actionable variables from the set of variables based on ranking two or more pre-determined variables from a set of pre-determined variables with respect to one or more target variables, wherein the set of actionable variables represents one or more variables from the ranked variables; and computing, by the processor, a correlation between the inventory stock maintenance data and the set of actionable variables based on an optimization model, wherein the optimization model is trained and generated based on the set of actionable variables.

15. The method as claimed in claim 14, wherein data associated with the inventory is received and data specific to the inventory is determined, and wherein the inventory data comprises at least manufacturing data, orders data, install base data, entity data, current stock data, expected orders data and order delivery date and time.

16. The method as claimed in claim 14, wherein the inventory specific data associated with a particular inventory is collated in a pre-defined format, and wherein the pre-defined format includes a structured table format comprising inventory specific data in a sequential order and an unstructured text format.

17. The method as claimed in claim 16, wherein the set of variables are determined by applying one or more feature selection techniques on the collated inventory data, and wherein the feature selection techniques comprises at least information theory, random forest algorithm and logistic regression algorithm.

18. The method as claimed in claim 14, wherein the ranking is carried out based on one or more statistical techniques, and wherein the statistical techniques comprises at least one of: principal component analysis technique, correlation coefficients, regression coefficients, mutual information and p-values of hypothesis tests.

19. The method as claimed in claim 14, wherein at least existing inventory data, previous inventory data, data associated with daily consumption of the inventory, items stock data, supply data of items from the inventory and items orders data is displayed based on the set of variables and the set of actionable variables.

20. The method as claimed in claim 14, wherein an alert notification is generated based on a pre-defined threshold limit associated with the set of actionable variables.

21. The method as claimed in claim 14, wherein the optimization model is trained and generated based on at least one of heuristic techniques, search techniques and optimization techniques, and wherein the heuristic techniques, search techniques and optimization techniques comprises genetic algorithms, harmony search, ant colony optimization, particle swarm optimization and simulated annealing.

22. The method as claimed in claim 14, wherein the set of actionable variables is optimized based on the generated optimization model.

23. The method as claimed in claim 14, wherein optimized set of actionable variables is modified based on one or more pre-defined optimization events associated with the set of actionable variables.

24. A computer program product comprising:

a non-transitory computer-readable medium having computer-readable program code stored thereon, the computer-readable program code comprising instructions, that when executed by a processor, cause the processor to:

determine a set of variables required for operating the inventory, wherein the set of variables represents one or more parameters associated with stock maintenance data of items present in the inventory;

wherein the one or more parameters comprises one or more factors associated with demand and supply data of the items and industry type; and wherein the demand and supply data of each item is associated with a unique and separate set of first factors and a set of second factors respectively, and wherein the first set of factors associated with the demand data comprises of data of source of demand, month of demand, and bulk demand; and wherein the second set of factors associated with the supply data comprises of lead-time period of delivery date, date of time period of supply, mode of transportation, data of transportation issues, data of packaging, data of date and timing of delivery, data of price of the item;

determine a set of actionable variables from the set of variables based on ranking two or more pre-determined variables from a set of pre-determined variables with respect to one or more target variables, wherein the set of actionable variables represents one or more variables from the ranked variables; and compute a correlation between the inventory stock maintenance data and the set of actionable variables based on an optimization model, wherein the optimization model is trained and generated based on the set of actionable variables.

* * * * *